US012592163B2

(12) United States Patent
    Almarouf

(10) Patent No.: US 12,592,163 B2
(45) Date of Patent: Mar. 31, 2026

(54) SYSTEM AND METHOD OF PROVIDING DIRECTIONAL ASSISTANCE AND TRAINING IN A PHYSICAL ACTIVITY

(71) Applicant: Abdullah Ali Almarouf, Riyadh (SA)

(72) Inventor: Abdullah Ali Almarouf, Riyadh (SA)

( * ) Notice: Subject to any disclaimer, the term of this patent is extended or adjusted under 35 U.S.C. 154(b) by 99 days.

(21) Appl. No.: 18/764,148

(22) Filed: Jul. 4, 2024

(65) Prior Publication Data

US 2026/0011264 A1 Jan. 8, 2026

(51) Int. Cl.
    *G09B 19/00* (2006.01)
    *G06V 40/20* (2022.01)
(52) U.S. Cl.
    CPC ........... *G09B 19/003* (2013.01); *G06V 40/23* (2022.01); *G09B 19/0038* (2013.01)
(58) Field of Classification Search
    CPC ... G09B 19/003; G09B 19/0038; G06V 40/23
    See application file for complete search history.

(56) References Cited

U.S. PATENT DOCUMENTS

2019/0054347 A1* 2/2019 Saigh ..................... A61B 5/103
2023/0236016 A1* 7/2023 Troncoso Aldas .... G06F 1/1686
                                                                701/433

* cited by examiner

*Primary Examiner* — Robert P Bullington, Esq.

(57) ABSTRACT

The present disclosure provides a system for providing directional assistance and training in a physical activity. The system comprises a wearable device (101) including vibrating devices (202), and a processor (102) for controlling the vibrating devices (202), a monitoring system (103) for monitoring an activity containing the users, a cloud server (105) configured to: receive data of monitoring of the activity, from the monitoring system (103), store pre-defined patterns of movements of the body and pre-defined parameters of vibrations for the patterns, identify real-time patterns of movements of the user based on the data received from the monitoring system (103), determine upcoming pattern of movements based on the real-time patterns and the pre-defined patterns, and transmit a command to the processor (102) of the wearable device (101) for controlling the vibrating devices (202) based on the pre-defined parameters of the determined pattern, thereby directing the user in performing the physical activity.

13 Claims, 10 Drawing Sheets

100

WEARABLE DEVICE
101₁

PROCESSING UNIT
102₁

WEARABLE DEVICE
101₂

PROCESSING UNIT
102₂

WEARABLE DEVICE
101ₙ

PROCESSING UNIT
102ₙ

COMMUNICATION
NETWORK
104

MONITORING
SYSTEM
103

CLOUD SERVER 105

DIRECTIONAL ASSISTANCE AND TRAINING ENGINE
106

COMMUNICATION
NETWORK 104

USER DEVICE 107

USER INTERFACE 108

PROCESSOR 109

MEMORY 110

ENTITY DEVICE111

ENTITY INTERFACE 112

PROCESSOR 113

MEMORY 114

Figure 2:
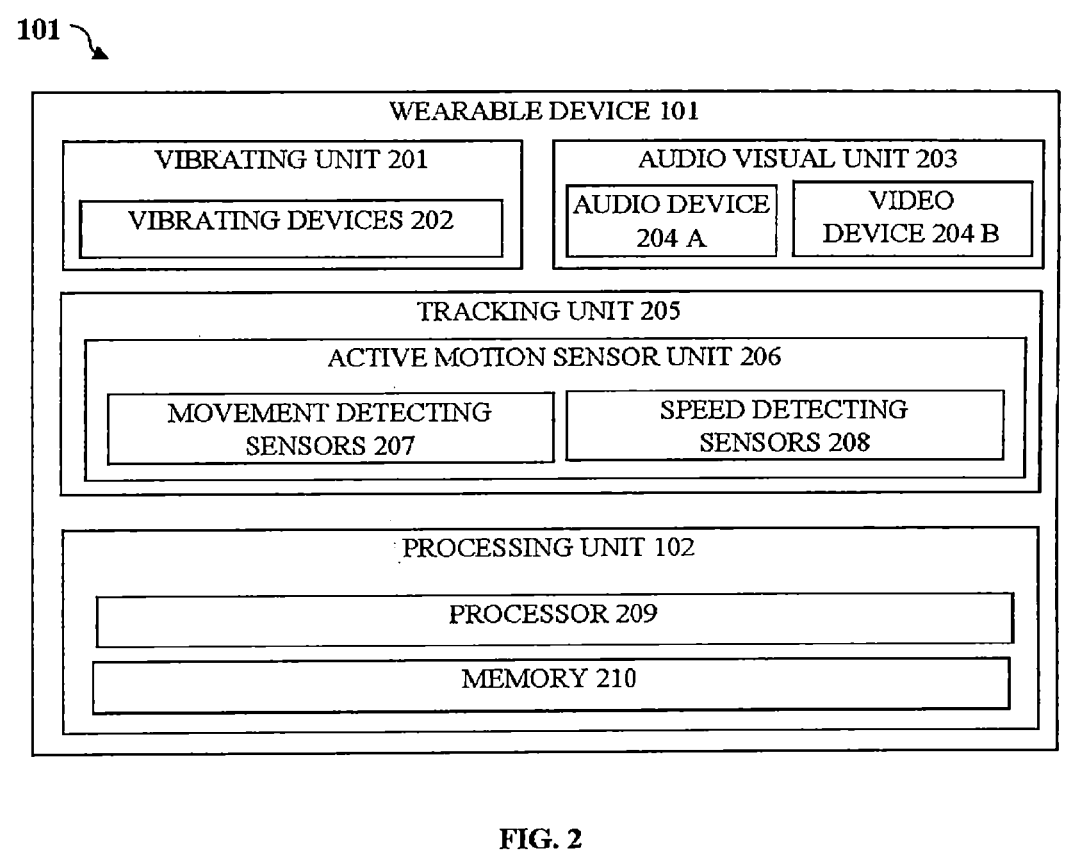

101

WEARABLE DEVICE 101

| VIBRATING UNIT 201 | AUDIO VISUAL UNIT 203 | |
| --- | --- | --- |
| VIBRATING DEVICES 202 | AUDIO DEVICE 204 A | VIDEO DEVICE 204 B |

TRACKING UNIT 205

ACTIVE MOTION SENSOR UNIT 206

| MOVEMENT DETECTING SENSORS 207 | SPEED DETECTING SENSORS 208 |
| --- | --- |

PROCESSING UNIT 102

PROCESSOR 209

MEMORY 210

MONITORING SYSTEM 103

VIDEO CAPTURING

DEVICES 301

LiDAR SENSORS

302

SENSOR SYSTEM

| Monitoring an activity of a plurality of users, by a monitoring system |
| :---: |
| 1101 |

↓

| Receiving data of the monitoring from the monitoring system, by a cloud server |
| :---: |
| 1102 |

↓

| Storing a plurality of pre-defined patterns of movements of the body and pre-defined parameters of vibrations for each of the patterns, by the cloud server |
| :---: |
| 1103 |

↓

| Identifying real-time patterns of movements of the user in the activity based on the data of the activity received from the monitoring system, by the cloud server |
| :---: |
| 1104 |

↓

| Determining upcoming pattern of movements for the user based on the real-time patterns and the pre-defined patterns, by the cloud server |
| :---: |
| 1105 |

↓

| Transmitting a command to a processor of a wearable device based on the pre-defined parameters of the determined pattern, by the cloud server |
| :---: |
| 1105 |

↓

| Controlling vibration of a plurality of vibrating devices in the wearable device based on the pre-defined parameters, by the processor |
| :---: |
| 1106 |

Fig. 10

SYSTEM AND METHOD OF PROVIDING DIRECTIONAL ASSISTANCE AND TRAINING IN A PHYSICAL ACTIVITY

FIELD

The embodiments herein generally relate to a system and method of providing directional assistance and training of performing a movement in a physical activity. More particularly, the disclosure relates to a system and method including a wearable device for directing the user to perform movements in a physical activity.

BACKGROUND AND PRIOR ART

Physical activities like sports involve a lot of limb and body movements. Specifically, activities including sports such as football, basketball, hockey, cricket, performing arts such as dance, martial arts, military combat training etc require precise and fixed movements of the body of the person for attaining the desired outcome.

Generally, learners undertake training to learn their desired activity. In order to further improve their skill in the activity, learners usually rely on one-on-one personalized training for receiving constant guidance and achieving perfection and agility in their bodily movements. However, due to the ratio of experienced and skilled coaches to the number of interested students being very less, the coaches and trainers find it difficult to correct the moves of each learner and thereby not being able to improve the required motions and directional agility in the specific sport.

Similarly, most of the other fields such as performing arts, martial arts, combat training, physiotherapy etc lack an efficient system for managing, monitoring and correcting precise movements of each of the person involved.

Therefore, there is a need for a system of monitoring movements of users in a physical activity. Moreover, there is a need for a system and method of providing real-time monitoring and directional assistance and training in performing movements of a physical activity.

OBJECTS

Some of the objects of the present disclosure are described herein below:

The main objective of the present disclosure is to provide a system and method of providing directional assistance and training of performing a movement in a physical activity.

Another objective of the present disclosure is to provide a system and method of providing directional assistance and training of performing a movement in a physical activity using artificial intelligence.

Still another objective of the present disclosure is to provide a cost-effective system and method of providing directional assistance and training of performing a movement in a physical activity for plurality of users with minimal human intervention.

Yet another objective of the present disclosure is to provide a system and method of providing directional assistance and training of performing a movement in a physical activity using a wearable device.

The other objectives and advantages of the present disclosure will be apparent from the following description when read in conjunction with the accompanying drawings, which are incorporated for illustration of preferred embodiments of the present disclosure and are not intended to limit the scope thereof.

SUMMARY

In view of the foregoing, an embodiment herein provides a system and method for providing directional assistance and training in a physical activity.

In accordance with an embodiment, the system comprises a wearable device for being worn on a plurality of parts on a body of a user, wherein the wearable device including a plurality of vibrating devices mounted in different directions, and a processor for controlling the vibrating devices, a monitoring system for monitoring an activity containing plurality of the users, wherein the monitoring system can include a plurality of video capturing devices for capturing video of the activity containing plurality of the users, and a plurality of LiDAR sensors for capturing three-dimensional data of an area of the activity containing the users, a cloud server in communication with the wearable device and the monitoring system, wherein the cloud server configured to receive data of monitoring of the activity, from the monitoring system, store pre-defined patterns of movements of the body and pre-defined parameters of vibrations for each of the patterns, identify real-time patterns of movements of the user in the activity based on image processing the data of the activity received from the monitoring system (103), determine upcoming pattern of movements for the user based on the real-time patterns and the pre-defined patterns, and transmit a command to the processor of the wearable device for controlling the vibrating devices based on the pre-defined parameters of the determined pattern, thereby directing the user in performing the physical activity.

In an embodiment, the wearable device including a plurality of movement detecting sensors for detecting pattern of movement of the user, and a plurality of speed detecting sensors for detecting speed and acceleration of movement of the user. In an embodiment, the cloud server configured to identify real-time patterns of movements of the user in the activity based on detected pattern of movement of the user and detected speed and acceleration of movement of the user received from the movement detecting sensors and the speed detecting sensors.

In an embodiment, the cloud server including a feedback unit, the feedback unit configured to: receive the detected pattern and the detected speed and acceleration from the wearable device, compare the detected pattern, speed and acceleration with the determined upcoming pattern, identify accuracy of the pattern and duration taken to perform the pattern by the user, based on the comparison, and calculate a percentage of similarity of the detected pattern, based on the comparison.

In an embodiment, the cloud server including an analysis unit, the analysis unit configured to: aggregate the comparison of the patterns of plurality of activities of the user, and represent statistics of performance of the user in the plurality of the activities based on the aggregated comparison.

In an embodiment, the analysis unit based on artificial intelligence and configured to select another stage of the activity based on the identified accuracy of the user performing the patterns of the movement in the activity for facilitating customization.

In an embodiment, a user device in communication with the cloud server, the user device including a user interface, a processor and a memory, and wherein the processor of the user device configured to: connect to the cloud server using a communication network, and facilitate access to the feedback unit and the analysis unit through the user interface.

In an embodiment, an entity device in communication with the cloud server, the entity device including an entity interface, a processor and a memory, and wherein the processor of the entity device configured to: connect to the cloud server using a communication network, receive plurality of pre-defined patterns for the physical activity and pre-defined parameters for each of the patterns from the entity, through the entity interface, and transmit the pre-defined and the pre-defined parameters received from the entity interface, to the cloud server. In an embodiment, wherein each of the activity including plurality of rules and plurality of stages, wherein the rules based on a sequence of patterns, complimentary patterns, and movement of objects in the activity, and wherein the stage including a set of patterns based on difficulty set by the entity.

In an embodiment, the processor of the entity device configured to: receive upcoming pattern of movements for the user from the entity, through the entity interface, and transmit the upcoming pattern of movements for the user received from the entity interface, to the cloud server, and wherein the cloud server configured to:

transmit a command to the processor of the wearable device for controlling the vibrating devices based on the pre-defined parameters of the upcoming pattern received from the entity device, thereby directing the user in performing the physical activity.

In an embodiment, the parameters including direction of vibration, intensity of vibrations, and sequence of vibrations, and wherein the parameters varying for each of the pattern of the movement, for facilitating the user in identifying the pattern for performing the physical activity.

In an embodiment, the wearable device including an audio device for emitting audio to the user, and a video device for displaying video to the user; and wherein the cloud server configured for transmitting the audio and the video.

In an embodiment, the activity can include but not limited to one of sports, performing arts, industrial operations, logistics and warehouse operations, crowd control operations, personnel training, interactive gaming, carpentry, plumbing, vocational training, military and tactical training, and workplace safety training.

In accordance with an embodiment, the method for providing directional assistance and training in a physical activity, comprising the following steps. monitoring an activity of a plurality of users, by a monitoring system, receiving data of the monitoring from the monitoring system, by a cloud server, storing a plurality of pre-defined patterns of movements of the body and pre-defined parameters of vibrations for each of the patterns, by the cloud server, identifying real-time patterns of movements of the user in the activity based on the data of the activity received from the monitoring system, by the cloud server, determining upcoming pattern of movements for the user based on the real-time patterns and the pre-defined patterns, by the cloud server, transmitting a command to a processor of a wearable device based on the pre-defined parameters of the determined pattern, by the cloud server, and controlling vibration of a plurality of vibrating devices in the wearable device based on the pre-defined parameters, by the processor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 illustrates a block diagram of a wearable device in the system of providing directional assistance and training in a physical activity, according to an embodiment herein;

FIG. 3 illustrates a block diagram of a monitoring system in the system of providing directional assistance and training in a physical activity, according to an embodiment herein;

FIG. 10 illustrates a flow chart of a method of providing directional assistance and training in a physical activity, according to an embodiment herein.

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
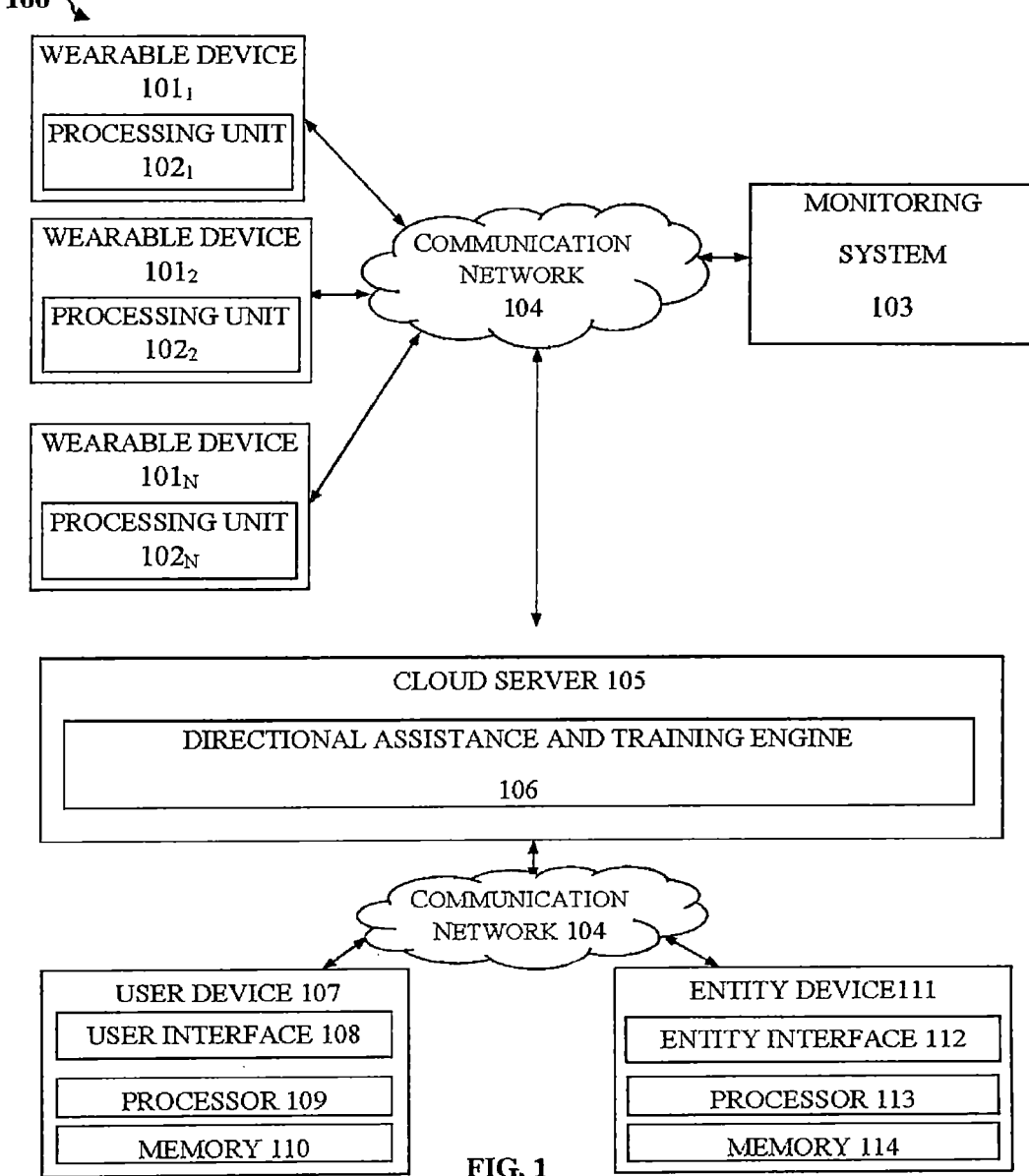
FIG. 1 illustrates a block diagram of a system of providing directional assistance and training in a physical activity, according to an embodiment herein.
Figure 3:
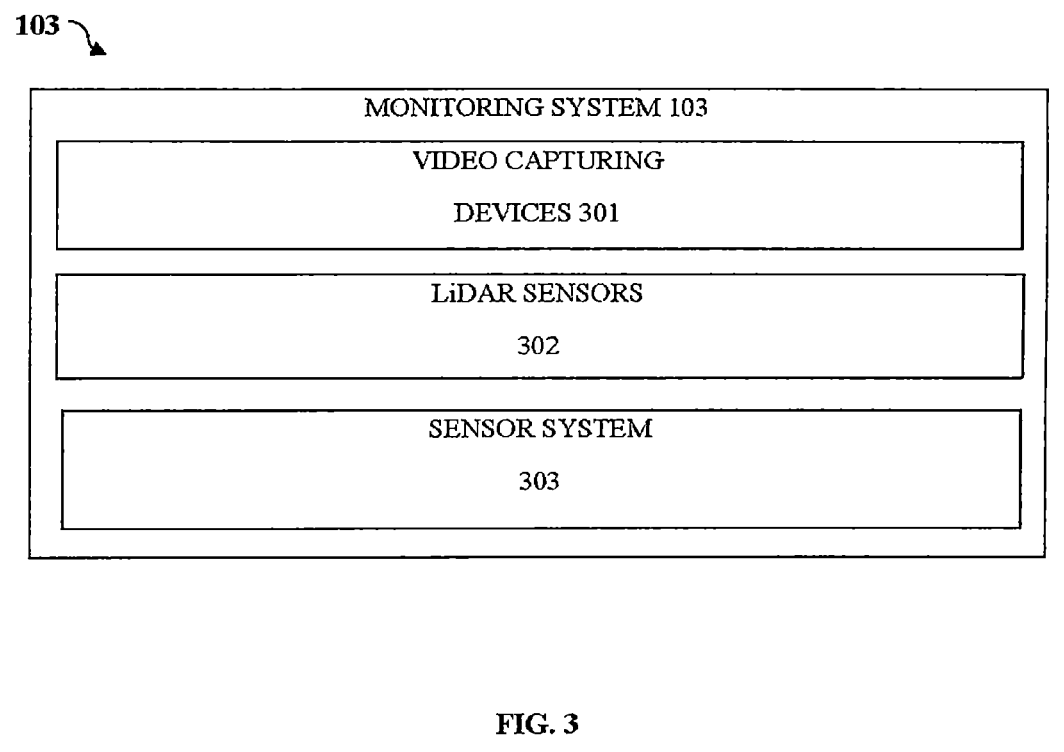

As mentioned above, there is a need for a system of monitoring movements of users in a physical activity. In particular, there is a need for a system and method of providing real-time monitoring and directional assistance and training in performing movements of a physical activity. The embodiments herein achieve this by providing "A SYSTEM AND METHOD OF PROVIDING DIREC- TIONAL ASSISTANCE AND TRAINING IN A PHYSICAL ACTIVITY". Referring now to the drawings, and more particularly to FIG. 1 through FIG. 3, where similar reference characters denote corresponding features consistently throughout the figures, there are shown preferred embodiments.

FIG. 1 illustrates a block diagram of a system of providing directional assistance and training in a physical activity. In an embodiment, the system can include a plurality of wearable devices 101, a monitoring system 103, a communication network 104, a cloud server 105, a user device 107 and an entity device 111.

In an embodiment, the wearable device 101 can be provided for being worn on a plurality of parts of a body of a user. In an exemplary embodiment, the wearable device can be work on parts including but not limited to arms, legs, feet, hands, fingers. The wearable device 101 can include a processing unit.

In an embodiment, the monitoring system 103 can be provided for monitoring an activity performed by the user. The activity can include but not limited to sports, performing arts, industrial operations, logistics and warehouse operations, crowd control operations, personnel training, interactive gaming, carpentry, plumbing, vocational training, military and tactical training, and workplace safety training.

In an embodiment, the wearable device 101 and the monitoring system 103 can be connected to the cloud server 105 through the communication network 105. The communication network 104 can include but not limited to internet. The cloud server 105 can include a directional assistance and training engine 106. The directional assistance and training engine 106 can be configured to control the wearable device 106 for providing directional assistance and training to the user.

In an embodiment, the user device 107 and the entity device 111 can be connected to the cloud server 105 using the communication network 104.

The user device 107 and the entity device 111 can include but not limited to a smartphone, tablet, laptop.

The user device 107 can include a user interface 108, a processor 109 and a memory 110. The user device 107 can be provided for facilitating the user wearing the wearable device 101 in accessing the cloud server 105.

The entity device 111 can include an entity interface 112, a processor 113 and a memory 114. The entity device 111 can be provided for facilitating an entity in accessing the cloud server 105 for controlling the wearable device 101 of the user. The entity can include a trainer, coach of the user.

FIG. 2 illustrates a block diagram of a wearable device in the system of providing directional assistance and training in a physical activity. In an embodiment, the wearable device 101 can include a vibrating unit 201 including a plurality of vibrating devices 202 mounted at different directions. The vibration devices 202 can emit vibrations for providing directional assistance and training to the user in performing the movement. Each of the vibrating unit 201 can include parameters of the vibration devices 202 for emitting predefined vibrations. The parameters can include but not limited to direction of vibration, intensity of vibration, duration of vibration and sequence of vibration. The parameters of the vibrations can be based on a pattern of movement of the user. The parameters of the vibration can facilitate the user in identifying the pattern and direction of moving their body for the activity.

In an embodiment, an audio visual unit 203 can be provided in the wearable device 101. The audio visual unit 203 can include an audio device 204A and a video device

204B. The audio device 204A can be provided for emitting audio of guidance for movements to be performed in the activity. The video device 204B can be for displaying video for displaying the activity. The audio device 204a can include but not limited to head phones. The video device 204b can include but not limited to VR device and smart glasses.

In an embodiment, a tracking unit 205 can be provided in the wearable device 101 for tracking movements performed by the user. The tracking unit 205 can include an active motion sensor unit 206 including a plurality of sensors. The sensors can include but not limited to movement detecting sensors 207 and a speed detecting sensors 208. The movement detecting sensors 207 can detect movement pattern and direction of movement of the user. The speed detecting sensors 208 can detect speed and acceleration of movement of the user.

In an embodiment, a processing unit 102 can be provided in the wearable device 101. The processing unit 209 can include a processor 209 and a memory 210. The processor 209 can be configured to control the vibrating unit 201 and the audio visual unit 203. The processor 209 can transmit detected data of the active motion sensor unit 206 to the cloud server 105.

In an embodiment, the processing unit 102 can be configured to control the vibrating unit 201 and the audio visual unit 203 based on threshold limits for preventing injuries and confusion and imparting safety to the user. The threshold limit can include a range of vibration intensity and emergency stop feature.

FIG. 3 illustrates a block diagram of a monitoring system in the system of providing directional assistance and training in a physical activity. In an embodiment, the monitoring system 103 can include a plurality of video capturing devices 301, a plurality of LiDAR sensors 302 and a sensor system 303. The video capturing devices 301, LiDAR sensors 302 and the sensor system 303 can be mounted at plurality of locations in an area of the activity.

The video capturing device 301 can include but not limited to a camera for capturing video of activity performed by the users in the area. The LiDAR sensors 302 can be provided for capturing a three-dimensional data of the area of the activity, wherein the three-dimensional data can be based on users, people other than users, and objects in the activity. The sensor system 303 can include but not limited to movement sensors, accelerometers for detecting movement and speed of the users in the area. The monitoring system can transmit the detected data to the cloud server 105.

Figure 4:
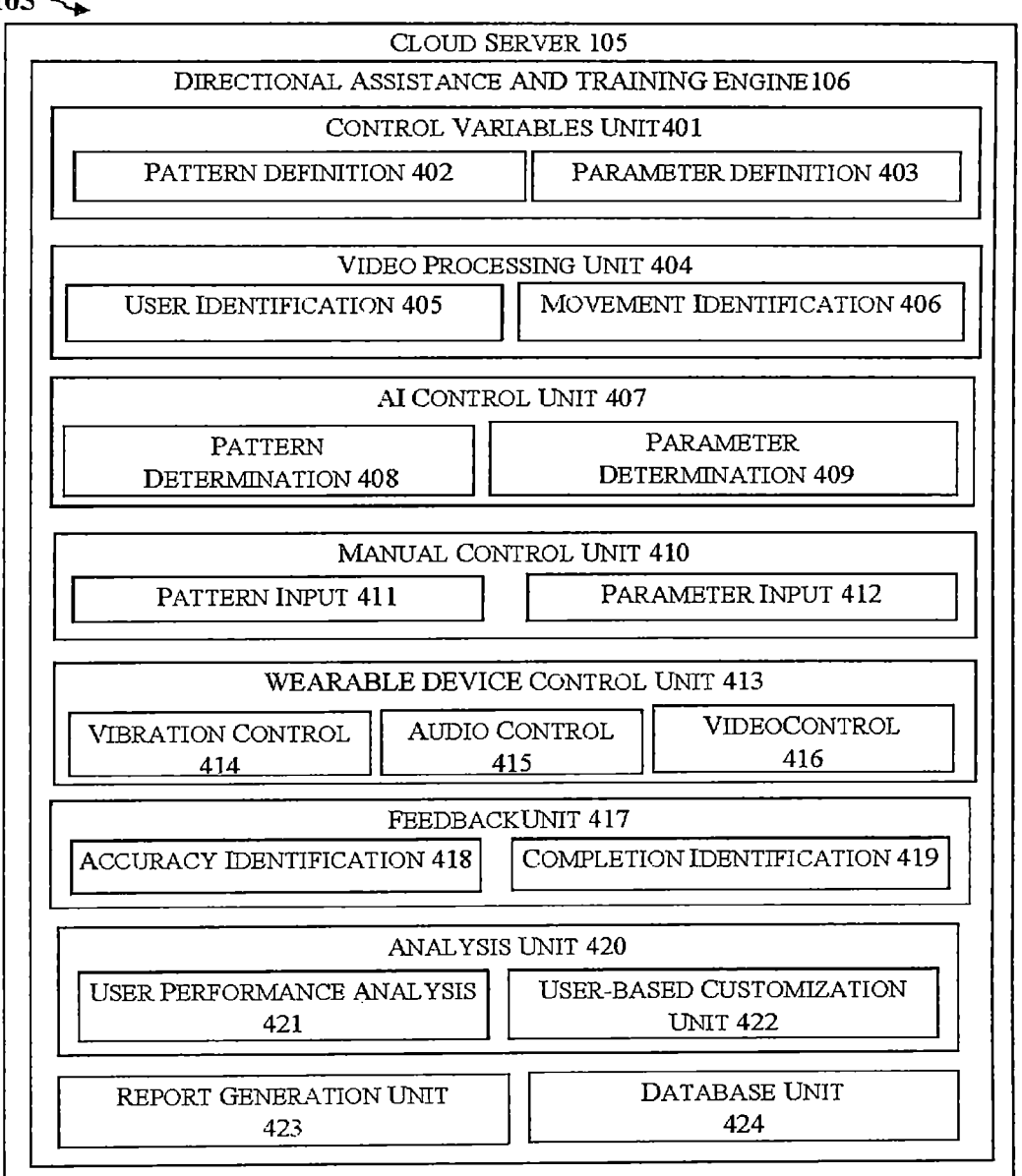
FIG. 4 illustrates a block diagram of a cloud server in the system of providing directional assistance and training in a physical activity, according to an embodiment herein.

FIG. 4 illustrates a block diagram of a cloud server in the system of providing directional assistance and training in a physical activity. In an embodiment, the cloud server 105 can include the directional assistance and training engine 106. The directional assistance and training engine 106 can include a control variables unit 401, a video processing unit 202, an AI control unit 407, a manual control unit 410, a wearable device control unit 413, a feedback unit 417, an analysis unit 420, a report generation unit 423 and a database unit 424.

In an embodiment, the cloud variables unit 401 can include a pattern definition unit 402 and a parameter definition unit 403. The pattern definition unit 402 can be provided for storing pre-defined patterns of movements of the body for plurality of activities. The parameter definition unit 403 can be provided for storing pre-defined parameters of vibrations for each of the patterns. The parameters can include but not limited to direction of vibration, intensity of vibration, duration of vibration and sequence of vibration.

In an embodiment, the entity interface 112 in the entity device 111 can receive input of plurality of patterns and parameters for a particular activity from the entity. The entity can define rules of activity, and multiple stages for an activity. The rules of an activity can include a set of patterns, complimentary patterns and sequence of patterns. The stages can include different set of patterns for different stages based on difficulty, rules, free play, tactical drills, or game simulations. In an exemplary embodiment, the stages can include but not limited to levels including beginner level, intermediate level and advanced level based on the activity and training requirement for the entity. The parameters are defined for each of the patterns. The parameters can control pre-defined operation of the vibrating devices 202 in the vibrating unit 201 for enabling the user wearing the wearable device 101 in identifying the motion to be performed. In an exemplary embodiment, the parameters can include repetitive vibrations of the vibrating devices in a left leg for directing the user in moving the left leg.

The entity device 111 can transmit the patterns and parameters to the cloud server 105.

In an embodiment, the control variables unit 401 can include an audio and visual unit. The audio and visual unit can store audio and visuals of game simulations and activity scenarios for transmitting to the audio visual unit 203 of the wearable device 101.

In an embodiment, the video processing unit 404 can include a user identification unit 405 and a movement identification unit 406. In an embodiment, the user identification unit 405 can perform image processing on video captured by the monitoring system. The image processing can perform identification of the users in the activity, objects in the area of the activity, people other than users in the activity.

In an embodiment, the movement identification unit 406 can perform image processing on the captured video for identifying real-time patterns from movement of the identified users, identify movement of the objects and identify movement of the identified people other than the users. The image processing can identify the real-time patterns of the user by comparing the movement of the user with the pre-defined patterns stored in the pattern definition unit 402.

In another embodiment, the movement identification unit 406 can process movement pattern and speed and acceleration detected by the tracking unit 205 in the wearable device 101 for identifying the real-time patterns of movement of the user.

In an embodiment, the database unit 424 can store a list of the users, people performing the activity and objects in the activity, wherein the list can be received from the entity device 111. In an exemplary embodiment, wherein the activity is football, the object can include ball, and the people other than the users can include players not using the wearable device.

In an embodiment, the AI control unit 407 can include a pattern determination unit 408 and a parameter determination unit 409. The AI control unit 407 can use artificial intelligence and machine learning. In an embodiment, the pattern definition unit 402 can store sequence of patterns and/or complimentary patterns based on plurality of conditions in the activity. The conditions can include but not limited to movement of object in the activity, movement of people around the users in the activity, performance of the user.

The pattern determination unit 408 can be provided for determining upcoming pattern of movements for the user based on the identified real-time patterns and the pre-defined sequence and/or complementary patterns. In an exemplary embodiment, in an activity of football, the pattern determination unit 408 can determine an upcoming pattern of leg movement base on position of the ball and other players on the field. In an embodiment, the real-time patterns can be received by the pattern determination unit 408 from the video processing unit 404.

In an exemplary embodiment, the pattern determination unit 408 can select the upcoming pattern from a different difficulty level based on performance of the user.

The parameter definition unit 409 can be provided for determining parameters for each of the upcoming patterns based on the pre-defined parameters for the patterns.

In an embodiment, the manual control unit 410 can include a pattern input 411 and a parameter input 412. The pattern input 411 can receive and store upcoming patterns for the user from the entity device 111. The entity can input upcoming patterns through the entity interface 112, for controlling the vibrating unit 201 of a user to impart direction assistance in an activity. The entity device 111 can transmit the upcoming patterns to the manual control unit 410. The parameter input 412 can receive input of parameters for the patterns from the entity device.

In an embodiment, the cloud server 105 can transmit commands to the wearable device 101 based on the upcoming patterns and the parameters received from the entity device 101 for providing directional assistance and training to the user.

In an embodiment, the wearable device control unit 413 can be provided in the cloud server 105 transmitting commands to the processor of the wearable device 101. A vibration control 414 can be provided for controlling the vibrating devices, an audio control 415 can be provided for controlling the audio device and a video control 416 can be provided for controlling the video device. The vibration control 414 can transmit parameters of the patterns for controlling the vibrating devices.

In an embodiment, the feedback unit 417 can include an accuracy identification unit 418. The accuracy identification unit 418 can be configured to receive the detected pattern and the detected speed and acceleration from the wearable device, compare the detected pattern, speed and acceleration with the determined upcoming pattern, and identify accuracy of the pattern and duration taken to perform the pattern by the user, based on the comparison. In an embodiment, the feedback unit 417 can include a completion identification unit 419 configured to calculate a percentage of similarity of the detected pattern, based on the comparison.

In embodiment, the analysis unit 420 can include an user performance analysis unit 421 configured to aggregate the comparison of the patterns of plurality of activities of the user, and represent statistics of performance of the user in the plurality of the activities based on the aggregated comparison.

In embodiment, the analysis unit 420 can include a user-based customization unit 422 configured based on artificial intelligence. The user-based customization unit 422 can be configured to determine a plurality of patterns for the physical activity of the user based on the performance of the user for facilitating customization. The user-based customization unit 422 can select another stage of the activity based on the identified accuracy of the user performing the patterns of the movement in the activity for facilitating customization.

In an embodiment, the report generation unit 423 can generate reports based on performance of the user providing detailed reports on progress, skills, and abilities in an activity for a duration.

In an embodiment, the database unit 424 can store data of wearable devices of plurality of users, user performance data, user analysis data, audio data for transmitting to the audio device, and video data for transmitting to the video devise.

Figure 5:
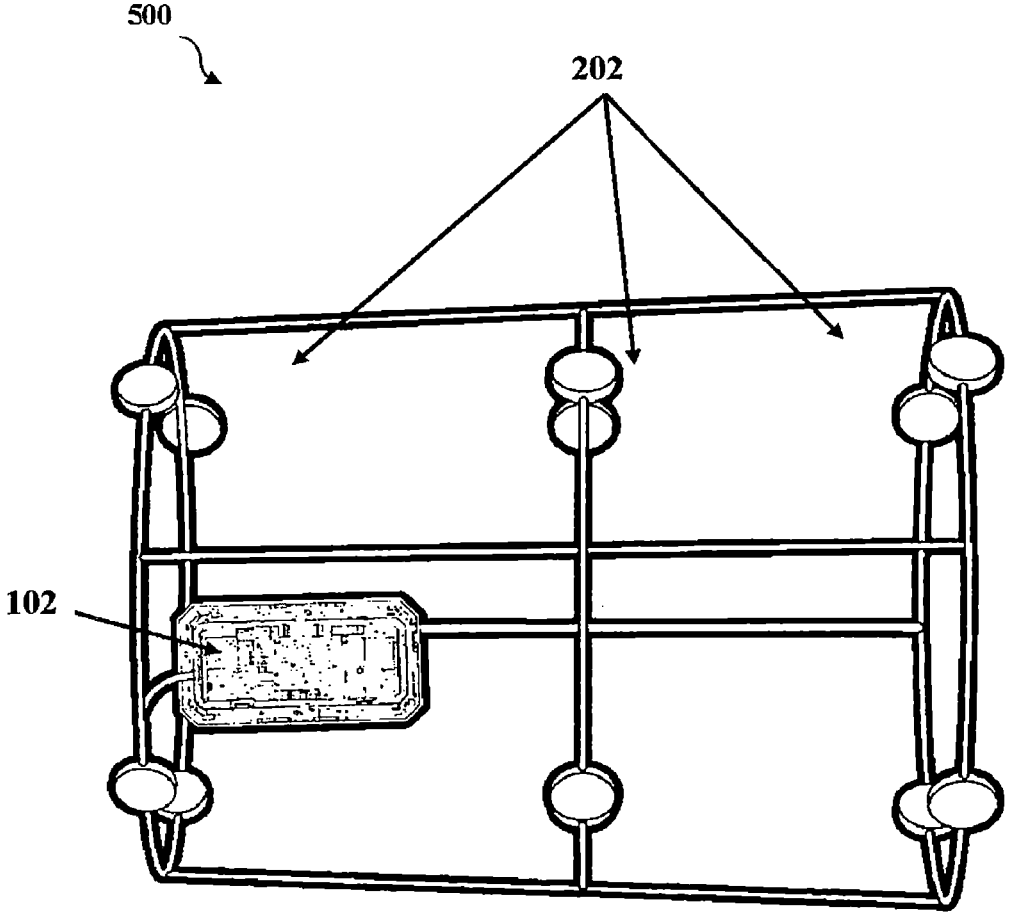
FIG. 5 illustrates a schematic of a wearable device providing directional assistance and training in a physical activity, according to an exemplary embodiment herein.

FIG. 5 illustrates a schematic of the system in the wearable device providing directional assistance and training in a physical activity, according to an exemplary embodiment. The system can include a circuit of the plurality of vibrating devices 202 connected to the processing unit 102.

Figure 6:
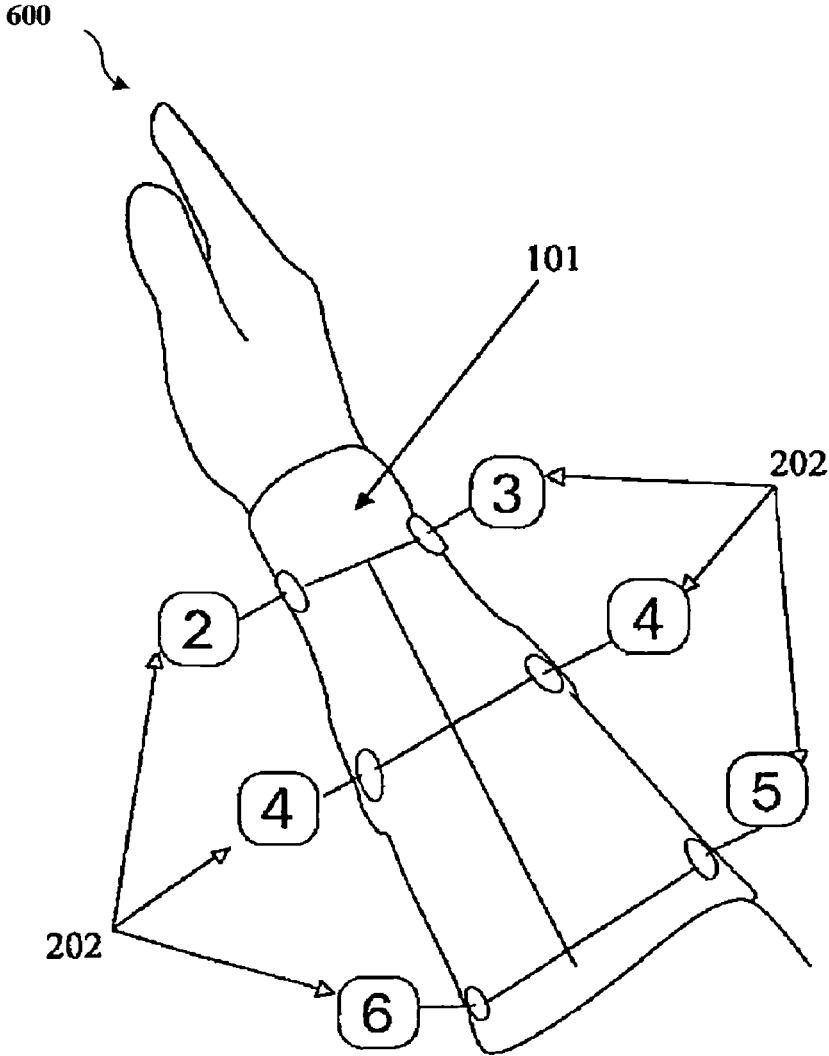
FIG. 6 illustrates a schematic of a wearable device providing directional assistance and training in a physical activity, according to an exemplary embodiment herein.

FIG. 6 illustrates a schematic of a wearable device providing directional assistance and training in a physical activity, according to an exemplary embodiment. The wearable device 101 can include a sleeve 101 worn on an arm of the user. the sleeve can include plurality of the vibrating devices 202 positioned in different directions.

Figure 7:
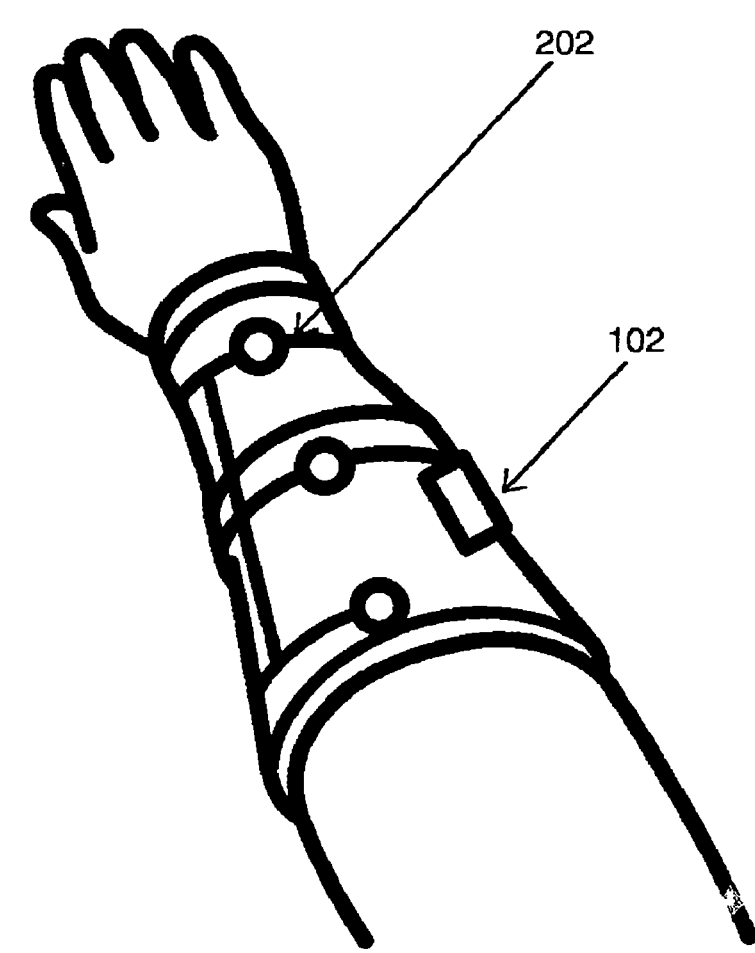
FIG. 7 illustrates a schematic of a wearable device providing directional assistance and training in a physical activity, according to an exemplary embodiment herein.

FIG. 7 illustrates a schematic of a wearable device providing directional assistance and training in a physical activity, according to an exemplary embodiment. The sleeve 101 of the wearable device 101 can include the vibrating devices 202 and the processing unit 102.

Figure 8:
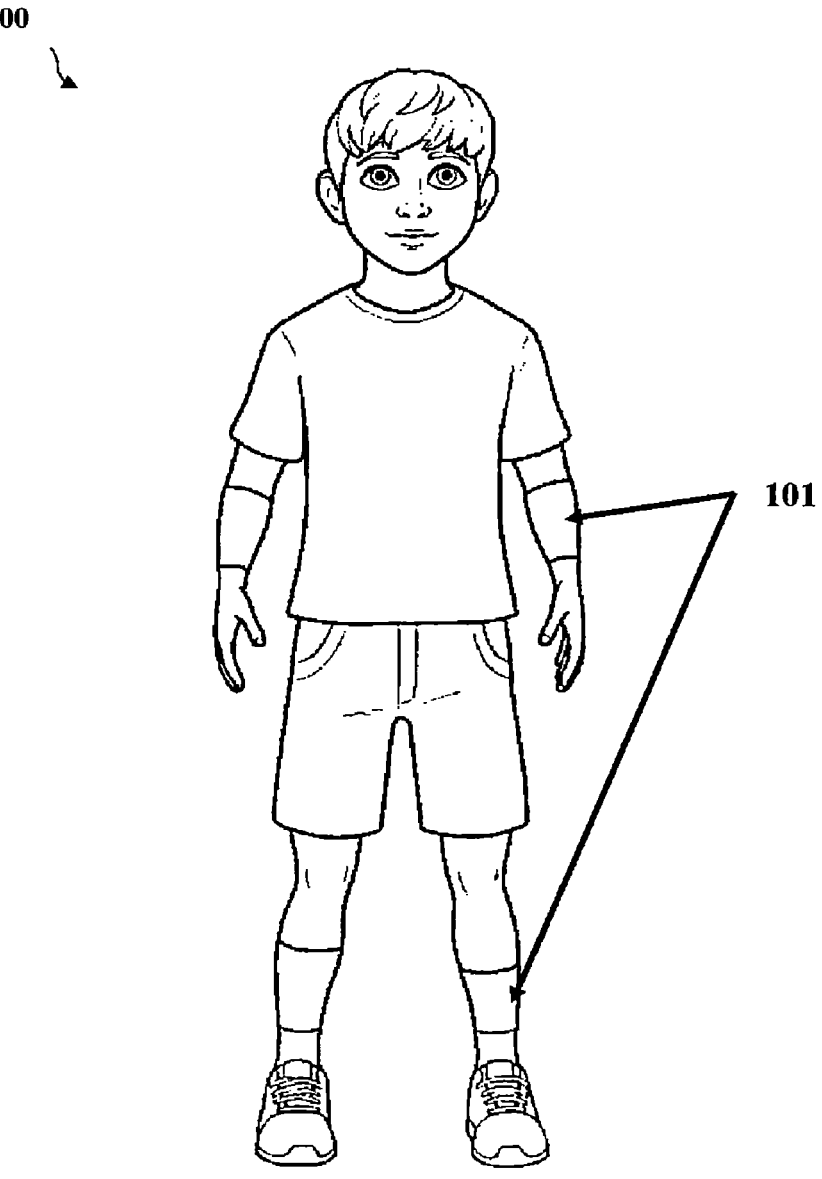
FIG. 8 illustrates a schematic of a user wearing the wearable device providing directional assistance and training in a physical activity, according to an exemplary embodiment herein.

FIG. 8 illustrates a schematic of a user wearing the wearable device providing directional assistance and training in a physical activity, according to an exemplary embodiment. A user wearing the wearable device as sleeves 101 on arms and legs.

Figure 9:
FIG. 9 illustrates a schematic of a plurality of users wearing the wearable device providing directional assistance and training and performing a physical activity, according to an exemplary embodiment herein.
Figure 9:
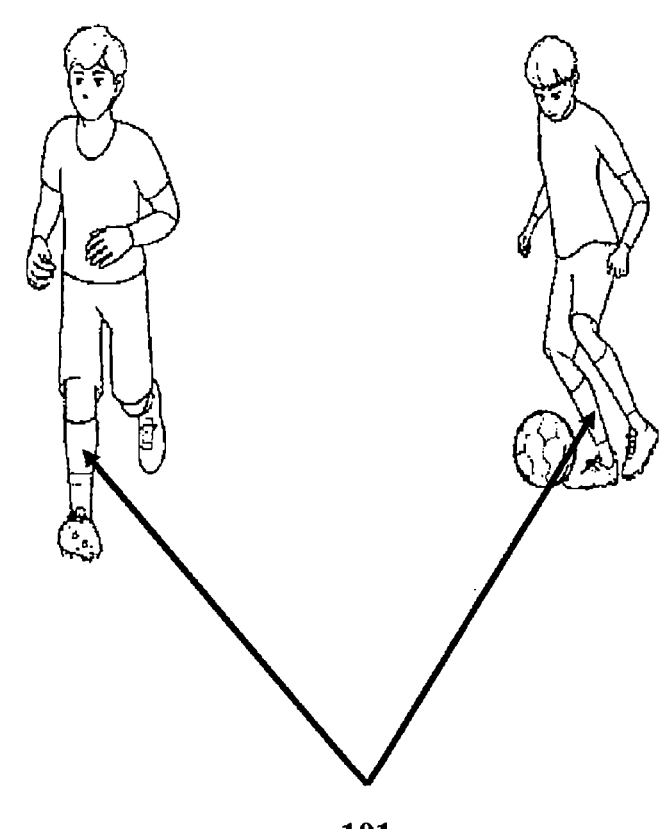

FIG. 9 illustrates a schematic of a plurality of users wearing the wearable device providing directional assistance and training and performing a physical activity, according to an exemplary embodiment. A plurality of users wearing the wearable device 101 on arms and legs for playing football.

FIG. 10 illustrates a flow chart of a method of providing directional assistance and training in a physical activity. In an embodiment, the method including following steps. First, monitoring 1101 an activity of a plurality of users, by a monitoring system, then receiving 1102 data of the monitoring from the monitoring system, by a cloud server, next storing 1103 a plurality of pre-defined patterns of movements of the body and pre-defined parameters of vibrations for each of the patterns, by the cloud server, identifying 1104 real-time patterns of movements of the user in the activity based on the data of the activity received from the monitoring system, by the cloud server, determining 1105 upcoming pattern of movements for the user based on the real-time patterns and the pre-defined patterns, by the cloud server, transmitting 1106 a command to a processor of a wearable device based on the pre-defined parameters of the determined pattern, by the cloud server, and finally controlling 1107 vibration of a plurality of vibrating devices in the wearable device based on the pre-defined parameters, by the processor.

A main advantage of the present disclosure is that the system and method provides directional assistance and training in a physical activity.

Another advantage of the present disclosure is that the system and method provides directional assistance and training of performing a movement in a physical activity using artificial intelligence Still another advantage of the present disclosure is that the system and method provides a cost-effective directional assistance and training of performing a movement in a physical activity for plurality of users with minimal human intervention.

Yet another advantage of the present disclosure is that the system and method provides directional assistance and training of performing a movement in a physical activity using a wearable device.

Still another advantage of the present disclosure is that the system and method provides customized learning to the user in performing the activity.

Yet another advantage of the present disclosure is that the system and method provides precision movement tracking and advanced game analysis.

Still another advantage of the present disclosure is that the system and method provides contextual coaching and dynamic game simulation.

Yet another advantage of the present disclosure is that the system and method provides automated performance analysis.

Still another advantage of the present disclosure is that the system and method can be used in applications including sport-specific modules, sports and games with dynamic sport rules, engineering projects, safety monitoring, physical therapy and motor skill recovery techniques, military and tactical training, rescue operations, performing arts including dance and theater rehearsals, industrial operations, logistics and warehouse operations, crowd control planning operations, personal fitness guidance, interactive gaming among others.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A system for providing directional assistance and training in a physical activity, comprising:
   a wearable device (101) for being worn on a plurality of parts on a body of a user,
   wherein the wearable device (101) including:
      a plurality of vibrating devices (202) mounted in different directions, and
      a processor (102) for controlling the vibrating devices (202);
   a monitoring system (103) for monitoring an activity containing plurality of the users, wherein the monitoring system (103) including:
      a plurality of video capturing devices (301) for capturing video of the activity containing plurality of the users, and
      a plurality of LiDAR sensors (302) for capturing three-dimensional data of an area of the activity containing the users; and
   a cloud server (105) in communication with the wearable device (101) and the monitoring system (103), wherein the cloud server (105) configured to:

store pre-defined patterns of movements of the body and pre-defined parameters of vibrations for each of the patterns, wherein each of the activity including plurality of rules and plurality of stages, wherein the rules based on a sequence of patterns, complimentary patterns, and movement of objects in the activity, and wherein the stage including a set of patterns based on difficulty, receive data of monitoring of the activity including the captured video and the three-dimensional data, from the monitoring system (103), identify real-time patterns of movements of the user in the activity based on image processing the data of the activity received from the monitoring system (103), determine upcoming pattern of movements for the user based on the real-time patterns and the pre-defined patterns, and transmit a command to the processor (102) of the wearable device (101) for controlling the vibrating devices (202) based on the pre-defined parameters of the determined pattern, thereby directing the user in performing the physical activity.

2. The system as claimed in claim 1, wherein the wearable device (101) including:

a plurality of movement detecting sensors (207) for detecting pattern of movement of the user, and a plurality of speed detecting sensors (208) for detecting speed and acceleration of movement of the user.

3. The system as claimed in claim 2, wherein the cloud server (105) including a feedback unit (417), the feedback unit (417) configured to:

receive the detected pattern and the detected speed and acceleration from the wearable device (101), compare the detected pattern, speed and acceleration with the determined upcoming pattern, identify accuracy of the pattern and duration taken to perform the pattern by the user, based on the comparison, and calculate a percentage of similarity of the detected pattern, based on the comparison.

4. The system as claimed in claim 3, wherein the cloud server (105) including an analysis unit (420), the analysis unit (420) configured to:

aggregate the comparison of the patterns of plurality of activities of the user, and represent statistics of performance of the user in the plurality of the activities based on the aggregated comparison.

5. The system as claimed in claim 3, wherein the analysis unit (420) based on artificial intelligence and configured to:

select another stage of the activity based on the identified accuracy of the user performing the patterns of the movement in the activity for facilitating customization.

6. The system as claimed in claim 5, wherein a user device (107) in communication with the cloud server (105), the user device (107) including a user interface (108), a processor (109) and a memory (110), and wherein the processor (109) of the user device (107) configured to:

connect to the cloud server (105) using a communication network (104), and facilitate access to the feedback unit (417) and the analysis unit (420) through the user interface (108).

7. The system as claimed in claim 1, wherein an entity device (111) in communication with the cloud server (105), the entity device (111) including an entity interface (112), a processor (113) and a memory (114), and wherein the processor (113) of the entity device (111) configured to:

connect to the cloud server (105) using a communication network (104), receive plurality of pre-defined patterns for the physical activity and pre-defined parameters for each of the patterns from the entity, through the entity interface (112), and transmit the pre-defined and the pre-defined parameters received from the entity interface (112), to the cloud server (105).

8. The system as claimed in claim 7, wherein the processor (113) of the entity device (111) configured to:

receive upcoming pattern of movements for the user from the entity, through the entity interface (112), and transmit the upcoming pattern of movements for the user received from the entity interface (112), to the cloud server (105), and wherein the cloud server (105) configured to:

transmit a command to the processor (102) of the wearable device (101) for controlling the vibrating devices (202) based on the pre-defined parameters of the upcoming pattern received from the entity device (111), thereby directing the user in performing the physical activity.

9. The system as claimed in claim 1, wherein the parameters including direction of vibration, intensity of vibrations, duration of vibration and sequence of vibrations, and wherein the parameters varying for each of the pattern of the movement, for facilitating the user in identifying the pattern for performing the physical activity.

10. The system as claimed in claim 1, wherein the wearable device (101) including:

an audio device (204A) for emitting audio to the user, and a video device (204B) for displaying video to the user; and wherein the cloud server (105) configured for transmitting the audio and the video for simulating the activity.

11. The system as claimed in claim 2, wherein the cloud server (105) configured to:

identify real-time patterns of movements of the user in the activity based on detected pattern of movement of the user and detected speed and acceleration of movement of the user received from the movement detecting sensors (207) and the speed detecting sensors (208).

12. The system as claimed in claim 1, wherein the activity including one of sports, performing arts, industrial operations, logistics and warehouse operations, crowd control operations, personnel training, interactive gaming, carpentry, plumbing, vocational training, military and tactical training, and workplace safety training.

13. A method for providing directional assistance and training in a physical activity, comprising:

monitoring (1101) an activity of a plurality of users, by a monitoring system;

receiving (1102) data of the monitoring from the monitoring system, by a cloud server;

storing (1103) a plurality of pre-defined patterns of movements of the body and pre-defined parameters of vibrations for each of the patterns, by the cloud server;

identifying (1104) real-time patterns of movements of the user in the activity based on the data of the activity received from the monitoring system, by the cloud server;

determining (1105) upcoming pattern of movements for
the user based on the real-time patterns and the pre-
defined patterns, by the cloud server;

transmitting (1106) a command to a processor of a wear-
able device based on the pre-defined parameters of the
determined pattern, by the cloud server; and controlling (1107) vibration of a plurality of vibrating
devices in the wearable device based on the pre-defined
parameters, by the processor.

\* \* \* \* \*